United States Patent [19]

Beresford et al.

[11] Patent Number: 5,026,743

[45] Date of Patent: Jun. 25, 1991

[54] AQUEOUS DISPERSION OF AN AMINO-EPOXIDE REACTION PRODUCT

[75] Inventors: Michael P. Beresford, Victoria, Australia; Richard P. Redman, Reading, England

[73] Assignee: Imperial Chemical Industries PLC, London, England

[21] Appl. No.: 423,712

[22] Filed: Oct. 18, 1989

Related U.S. Application Data

[63] Continuation of Ser. No. 71,543, Jul. 7, 1987, abandoned, which is a continuation of Ser. No. 852,110, Apr. 15, 1986, abandoned.

[30] Foreign Application Priority Data

Apr. 18, 1985 [GB] United Kingdom ................ 8509955
Mar. 17, 1986 [GB] United Kingdom ................ 8606495

[51] Int. Cl.$^5$ ..................... C08G 59/14; C08G 59/16
[52] U.S. Cl. .................................. 523/404; 528/103; 528/103.5; 528/120; 528/121; 528/123; 525/523; 525/533
[58] Field of Search ............ 528/120, 121, 103, 103.5, 528/123; 523/404; 525/523, 533

[56] References Cited

U.S. PATENT DOCUMENTS

| | | | |
|---|---|---|---|
| 3,299,169 | 10/1967 | Smith | 528/111 |
| 3,549,592 | 12/1970 | Godfrey et al. | 528/117 |
| 3,666,788 | 5/1972 | Rowton | 528/67 |
| 3,847,726 | 11/1974 | Becker et al. | 528/219 |
| 3,929,717 | 12/1975 | Lee | 525/117 |
| 3,943,104 | 3/1976 | Waddill | 528/121 |
| 4,064,090 | 12/1977 | Gibson et al. | 524/901 |
| 4,182,831 | 1/1980 | Hicks | 528/120 |
| 4,490,520 | 12/1984 | Ogasa et al. | 528/315 |
| 4,740,582 | 4/1988 | Coquard et al. | 525/420.5 |
| 4,880,872 | 11/1989 | Thomas | 525/445 |
| 4,891,406 | 1/1990 | Bittscheidt et al. | 525/176 |

FOREIGN PATENT DOCUMENTS

| | | | |
|---|---|---|---|
| 0070550 | 1/1983 | European Pat. Off. | 525/533 |
| 2105161 | 4/1972 | France . | |
| 2134566 | 12/1972 | France . | |
| 2231719 | 12/1974 | France . | |
| 1376535 | 12/1974 | United Kingdom . | |
| 2025985 | 1/1980 | United Kingdom . | |

Primary Examiner—John C. Bleutge
Assistant Examiner—Robert E. Sellers, II
Attorney, Agent, or Firm—Cushman, Darby & Cushman

[57] ABSTRACT

Non-gelled amine-epoxide reaction products are obtained by co-reacting a secondary amine, a polyoxyalkylene polyamine, a polyepoxide and optionally a monoepoxide. The products are crosslinkable and are useful in aqueous coating compositions, particularly when applied to a substrate by cathodic electrodeposition.

18 Claims, No Drawings

AQUEOUS DISPERSION OF AN AMINO-EPOXIDE REACTION PRODUCT

This is a continuation file-wrapper of application Ser. No. 07/071,543, now abandoned, filed July 7, 1987, which is a continuation of Ser. No. 06/852,110 filed Apr. 15, 1986, now abandoned.

This invention relates to amine-epoxide reaction products and to aqueous dispersions thereof which may be used in coating compositions suitable for application to a substrate by electrodeposition.

It is known that aqueous dispersions of ionisable salts of certain amine-epoxide reaction products are useful in coating compositions which are to be applied to a cathodic substrate by electrodeposition. Typical ionisable salts of reaction products of this type and of aqueous dispersions thereof which are useful in coating compositions to be used in an electrodeposition process are described in U.S. Pat. No. 4,064,090.

Reaction products of this general type are particularly useful in cathodic electrodeposition processes since, in general, they impart to a cured coating on a substrate a good resistance to corrosion (which is a characteristic of the epoxide resins) and the amine nitrogen atoms provide a suitable site for the cationic charge necessary for cathodic deposition. In addition they usually contain groups, for example hydroxyl groups, which are reactive with a crosslinking agent which also can be present in the coating composition which is to be applied to a substrate by electrodeposition.

It is also known, for example from European Patent Publication No. 070,550 and from U.S. Pat. No. 3,963,663 that polyoxyalkylene polyamines are useful as an amine reactant in this type of amine-epoxide reaction product since they improve the flexibility of the final coating. In both of these publications the epoxide reactant has an average 1,2-epoxy functionality greater than 1.0.

We have now found that improved reaction products of the amine-epoxide type, which are particularly useful in coating compositions to be applied to a substrate by a cathodic electrodeposition process, can be prepared by coreacting a polyepoxide, a polyoxyalkylene polyamine, a secondary amine and, optionally, a monoepoxide. The improvements relate in particular to the corrosion resistance and other properties of the final coating film and to the properties of application, for example the emulsion stability and throwing power of the aqueous dispersion.

According to this invention we provide a non-gelled amine-epoxide reaction product which is obtained by coreacting:

A, a secondary amine $NHR_1R_2$, wherein $R_1$ and $R_2$, the same or different, may be $C_{1-18}$ alkyl, or cycloalkyl, substituted alkyl or substituted cycloalkyl, or $R_1R_2$ may represent together with the nitrogen atom a cyclic structure, optionally substituted;
B, a polyepoxide;
C, a polyoxyalkylene polyamine; and, optionally,
D, a monoepoxide.

The coreactants may be reacted in a single stage; or two or more of the coreactants may be reacted in a first stage to give an intermediate product, followed by a further reaction stage or stages in which the remaining coreactants are reacted with the preformed intermediate reaction product.

The proportions of the polyfunctional reactants B and C are selected, taking into account the proportion of the monofunctional reactant A and, the proportion of the optional monofunctional reactant D, such that the final reaction product is not gelled.

Preferably the polyepoxide has a 1,2-epoxide functionality of from 1.1 to 2.0 more preferably 1.3 to 2.0 and still more preferably 1.4 to 1.8. If the 1,2-epoxide functionality of the polyepoxide is significantly greater than 2.0 then there is a risk of gelation.

Examples of suitable polyepoxides include the polyglycidyl ethers of cyclic polyols of epoxide equivalent in the range 150-2500, preferably in the range 200-2000, more preferably in the range 400-1000. Specific examples of suitable polyepoxides include those prepared by the etherification of a poly-phenol with epichlorhydrin in the presence of an alkali. The polyphenol may be for example bis(4-hydroxyphenyl)-2,2-propane. Suitable polyepoxides include those which are commercially available from Shell Chemicals under the Registered Trade Mark "Epikote", for example "Epikote" 1001, 1004 and 1007. Polyepoxides of lower molecular weight may be chain-extended to provide polyepoxides of higher molecular weight, for example by reaction with a bisphenol.

Other suitable polyepoxides include the diglycidyl ethers of polypropylene glycol, for example those having an epoxide equivalent in the range 150-350. Polyepoxides of this type are commercially available from Dow Chemicals as DER 732 and 736.

Suitable polyepoxides also include those in which the 1,2-epoxy functionality of a precursor has been reduced by reaction of a proportion of epoxide groups with a capping or terminating agent, for example a phenol or a monocarboxylic acid. Suitable phenols include phenol, alkylated phenols such as cresol, nonyl phenol and tert butyl phenyl phenol, aryl phenols such as phenyl phenol and naphthol and substituted phenyl phenols; and other substituted phenols such as nitrophenol and chlorophenol. Suitable carboxylic acids include benzoic acid, stearic acid and dimethyl propionic acid. Preferably not more than 50% of the original or potential 1,2-epoxy functionality of a polyepoxide is reduced in this way, and it must be borne in mind that the final 1,2-epoxide functionality is to be preferably not less than 1.1. When a polyepoxide has a nominal 1,2-epoxide functionality of approximately 2, for example as with the commercially available "Epikote" resins mentioned above, then preferably 15-35%, more preferably 20-30%, of the epoxide groups are terminated or capped as described above. The polyepoxide of reduced functionality may be prepared by reacting a preformed polyepoxide with a capping or terminating agent or, alternatively, by reacting certain polyepoxide-providing reactants, e.g. chain-extending reactants as mentioned above, in the presence of an appropriate proportion of the capping or terminating agent, e.g. a phenol. It is found that the capping or termination of epoxide groups in this way can contribute to the stability of derived aqueous emulsions.

The polyoxyalkylene polyamine is preferably a diamine or a triamine, or more preferably a triamine. Preferably the amino groups are primary amino groups which each contain two reactive hydrogen atoms wherein the second reactive hydrogen atom is much less reactive than the first reactive hydrogen atom after the first reactive hydrogen atom has been reacted with an epoxide. Mixtures of diamines and triamines may be used. A diamine may have a functionality of up to 4. A triamine may have a functionality of up to 6. However, in view of the foregoing preferment as to reactivity of the amino hydrogen atoms, preferably they have effective functionalities of 2 and 3 respectively. In one preferred type of reaction product the functionality of the polyoxyalkylene polyamine is reduced by reaction with the optional monoepoxide (D) before it is reacted with the polyepoxide (B). Preferably the effective functionality of the polyamine is reduced in this way to not less than 1.5.

One preferred polyoxyalkylene polyamine is a diamine of structure:

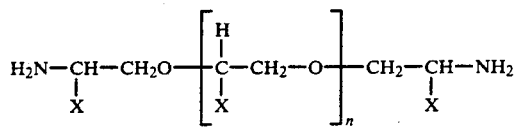

wherein X is hydrogen or $C_{1-6}$ alkyl and n is an integer in the range 1-50. Polyoxyalkylene diamines of this type are commercially available from the Jefferson Chemical Company under the trademark "Jeffamine", for example as D-400 and D 2000. Other suitable polyoxyalkylene diamines include the following which are commercially available from BASF: 3,3'-[1,2-ethanediylbis(oxy)]bis-1-propanamine or (4,7-dioxadecane-1,10-diamine), polyoxypropylene diamine (Etherdiamine 230, 400 & 2000), 3,3'-[1,4-butane-diylbis (oxy)]bis-1-propanamine or (4,9-dioxadodecan-1,12-diamine) 3,3'-[oxybis(2,1-ethanediyloxy)]bis-1-propanamine or (4,7,10-trioxatridecan-1,13-diamine), and bis(3-aminopropyl)-polytetrahydrofuran 750, 1100 and 2100.

Another preferred polyoxyalkylene polyamine is a triamine which has the general structure:

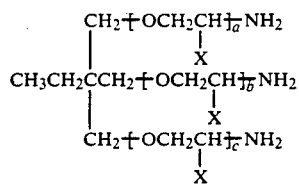

wherein X=hydrogen or $C_{1-6}$ alkyl, for example methyl or ethyl, and $a+b+c=3-30$.

One suitable such triamine is commercially available as Jeffamine T-403 where $a+b+c=5.3$(approx.), $x=CH_3$.

The polyoxyalkylene polyamine is preferably of number average molecular weight in the range 150-4000, more preferably in the range 200-2000.

It may be preferred to reduce the proportion of polyoxyalkylene polyamine which is used; for example by replacing some of it with a monoprimary amine which has reactive hydrogen atoms each readily reactive with an epoxide group. This primary amine thus fulfills an epoxide-bridging function of the replaced polyamine. Suitable monoprimary amines include, for example, ethanolamine, butylamine and long chain fatty amines such as the amine obtained by the reduction of the amide of coconut oil fatty acid. The monoprimary amine may also contain within its structure a tertiary amino group, for example it may be dimethylamino propylamine, diethylamino propylamine, N-aminopropyldiethanolamine or N-aminopropyl-morpholine.

As previously mentioned, according to one aspect of the invention it is preferred to react the polyoxyalkylene polyamine (C) with at least a proportion of the optional monoepoxide (D) before the polyoxyalkylene polyamine is reacted with the remaining reactants. However, according to another preferred aspect of the invention, satisfactory reaction products can be obtained when the same proportions of reactants as are used in such a preferred process are all coreacted in a single stage. According to a further preferred aspect of the invention the monoepoxide is excluded as a coreactant. In general the amount of the optional monoepoxide (D) which is used depends upon two requirements, (a) the stability of the emulsion which is obtained from the final reaction product after it is treated with acid and emulsified in water and (b) the requirement to leave for reaction with the polyepoxide on average at least one reactive amino hydrogen atom per molecule of diamine or triamine; and preferably to leave in the final product, i.e. even after reaction with the polyepoxide, some secondary amino groups.

Particularly suitable monoepoxides are the glycidyl esters of carboxylic acids, for example the glycidyl ester of an acid in which the carboxyl group is attached to a tertia $C_8$ alkyl group (commercially available as "Cardura" E from Shell Chemicals). Other suitable monoepoxides are glycidyl ethers, for example alkyl glycidyl ether optionally substituted where the alkyl group may be for example butyl or hexyl, or aryl glycidyl ethers optionally substituted for example phenyl glycidyl ether.

The optional intermediate product which is obtained by reacting the polyoxyalkylene polyamine (C) with the monoepoxide (D) according to the above-mentioned one preferred aspect of the process, is preferably reacted in a further single stage with the remaining reactants, the polyepoxide (B) and the secondary amine (A). Alternatively the reaction with the polyepoxide and the secondary amine may be carried out in separate stages. Suitable secondary amines (A) include dialkylamines, for example diethylamine and diisopropylamine; substituted dialkylamines, for example the preferred hydroxyalkylamines such as diethanolamine, N-methylethanolamine and diisopropanolamine; and cycloaliphatic amines, for example hydroxyethylpiperazine, morpholine and N-methylpiperazine.

When defining the relative proportions of the reactant components which are preferably used in preparing the amine-epoxide reaction product of this invention it is convenient to refer to the relative molar proportions of the reacting functional groups which are present in each reactant T, A, B, C and D (where T denotes the capping or terminating agent used with the polyepoxide) and these can be expressed as the following ratio, T (monofunctional; terminating group):
B (polyfunctional; epoxide groups in a polyepoxide before termination with T, i.e. including terminated epoxide):
C (polyfunctional; primary amino groups in polyoxyalkylene polyamine before optional reaction with D):
D (monofunctional; epoxide group):
A (monofunctional; secondary amino group).

Preferably the reactants are used in the following ratio ranges:
0-2 : 2-6 : 1.5-3.5 : 0-2 : 0.25-1.5 more preferably in the ratio ranges:
0.5-1.5 : 3-5 : 2-3 : 0-1 : 0.5-1.5 .

When, as described above, a portion of the polyoxyalkylene amine is replaced by a primary amine, the ratio range of the polyoxyalkylene amine is reduced to 1.0-3.0 and there is used a relative molar proportion of up to 1 of the primary amine.

Clearly the amine-epoxide reaction products obtained by the process of this invention will comprise a complex mixture of components, and the nature of the mixture will depend for example upon the relative proportions of the reactants. We believe, but without limitation, that certain components are beneficial in a reaction product which is to be employed as its ionizable salt in aqueous dispersion in a coating composition for application by a process of electrodeposition. For example we believe that when C is a diamine structures A'-B'-C'-D' and A'-B'-A' (where A',B',C' and D' represent the residues of the reactants A,B,C and D respectively) may be beneficial in certain respects. When C is a triamine and there is also used a capping or-terminating agent T it is believed that A'-B'-C'-B'-T' or

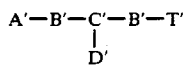

may be useful structures (where A',B',C',D' and T' represent the residues of the reactants A,B,C,D and T respectively).

Any of the stages for reacting A,B,C and optionally D and/or T may be carried out in inert organic solvent, at temperatures of 50°-200° C., preferably 75°-150° C. Suitable such solvents include methyl isobutylketone, "Cellosolve" acetate, ethyl butyl "Cellosolve" and toluene. In general it is desirable to add the secondary amine to the polyepoxide in situ before adding the polyoxyalkylene polyamine.

Preferably the final amine-epoxide reaction product has an amine value of 0.5-2.0 millimoles/g and an epoxide value of approximately zero.

Aqueous dispersions of the amine-epoxide reaction product may be prepared by adding water and a suitable neutralizing acid, for example an inorganic acid such as phosphoric acid or an organic acid such as acetic acid or lactic acid, to the above final product; preferably distilling off the volatile organic solvent which is present; and then emulsifying under conditions of high shear.

The invention thus provides also an aqueous dispersion of an ionizable acid salt of a non-gelled amine-epoxide reaction product prepared as herein described.

In additon to the ionized acid salt of the amine-epoxide reaction product other materials which may be present also in the above aqueous dispersion when used as a coating composition include, for example, a crosslinking agent for the amine-epoxide reaction product, for example a capped or blocked poly-isocyanate, a β-hydroxyester of the type described in EP 0 040 867, or phenol-, melamine-, benzoguanamine-, glycoluril-, or urea-formaldehyde resins; catalysts, for example for the crosslinking reaction; surfactants; pigments; conalescing solvent, and any other material which is conventionally present in aqueous coating compositions.

Thus the present invention also provides a coating composition which comprises an aqueous dispersion of an ionizable acid salt of the amine-epoxide reaction product prepared as herein described together with a crosslinking agent.

The coating composition is particularly suitable for application to a conductive substrate by electrodeposition and the invention also provides a process of coating by electrodeposition a conductive substrate, immersed as a cathode in the composition, by passing an electric current between the substrate and a counter-electrode.

In addition to the materials mentioned above as possible components of a coating composition according to this invention, there may also be present organic film-forming components, usually polymeric components, in addition to the amine-epoxide reaction product. Preferably there is present in the aqueous dispersion of a coating composition derived therefrom at least 50% by weight of the amine-epoxide reaction product based on the total organic film-forming components, but in addition to any crosslinking agent (which is mentioned above) there may be present other film-forming components for example acrylic or vinyl polymers, alkyd resins, polyesters and polurethanes. These further components preferably contain groups which are crosslinkable, for example hydroxyl groups, and these groups are preferably reactive with the crosslinking agent, for example a blocked polyisocyanate, present to crosslink the amine-epoxide reaction product. These further organic, preferably polymeric, components may be present to improve or modify the characteristics of the coating film obtained from a coating composition. For example, when the coating compositions are applied to a substrate by electrodeposition it may be necessary to add suitable components to improve adhesion between the electrodeposited film and the substrate or a subsequently applied coating; to minimise the formation of craters in the coating; to improve the throwing power of the composition; or to increase the film thickness. Certain hydroxyl group-containing acrylic copolymers have been found useful in certain of these respects, for example a hydroxybutyl acrylate/butylacrylate copolymer.

The process of applying by electrodeposition the coating compositions of this invention is in general conventional.

In addition to their use as a primary film-forming component of the coating compositions of this invention the amine-epoxide reaction products may also be useful as pigment dispersants in these or similar coating compositions. In such a case the amine-epoxide reaction product may be used to disperse a pigment or mixture of pigments, extenders and the like in an aqueous medium before being combined with a primary film-forming component of the coating composition. The amount of the amine-epoxide reaction product which is used in this preliminary pigment dispersion step in aqueous medium may be in the range 1-60%, preferably 4-40%, by weight based on total solids weight of the preliminary dispersion. The amount of pigment present in the preliminary dispersion may be in the range 10-80%, preferably 15-70% by weight based on the total solids weight of the preliminary dispersion.

The invention is illustrated by the following Examples in which parts and percentages are by weight.

EXAMPLE 1

This Example illustrates the preparation of an epoxide-amine reaction product according to the invention by a process in which a polyoxyalkylene diamine is first reacted with a monoepoxide in equimolar proportions and the reaction product then reacted with a polyepoxide and a secondary amine in the molar ratio 5:4:3 respectively. The Example also illustrates the preparation of a stable aqueous dispersion of the reaction product and the use of this dispersion in a pigmented coating composition to coat a metallic article by electrodeposition.

(a) Reaction of a Polyoxyalkylene Diamine With a Monoepoxide 2000 parts of a linear polyoxypropylene diamine of number average molecular weight 400 which had terminal primary amino containing groups of structure

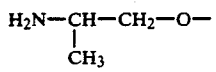

(commercially available from the Jefferson Chemical Company as "Jeffamine" D400) was mixed with 1250 parts of the glycidyl ester of a $C_8$ tertiary alkyl carboxylic acid (commercially available from Shell Chemicals as Cardura E) and heated to 100° C. After the exotherm the temperature was maintained at 115° C. for about 90 minutes when the epoxy value had fallen to approximately zero. The product had an amine value of 2.81 millimoles/g.

(b) Reaction of Product from (a) with a Polyepoxide and a Secondary Amine 1714 parts of a diepoxide (commercially available from Shell Chemicals as "Epikote" 1004 ["Epikote" is a Registered Trade Mark], were dissolved in 1051 parts of methylisobutyl ketone by heating to 90° C. with vigorous stirring. The solution had an epoxide value of 0.67 millimoles/g. 447 parts of the product of (a) above and 85.8 parts of methyl ethanolamine were added to the solution of the diepoxide and the mixture was maintained at the reflux temperature for 2 hours. The epoxide value had then fallen to 0.01 millimoles/g; the amine value was 0.74 millimoles/g; and the solids content of the product was 68% by weight.

(c) Preparation of Aqueous Dispersion of Epoxide-Amine

Reaction Product; its use in a Composition;

and Application of the Composition to a Substrate by Electrodeposition 900 parts of the product obtained in (b) above were mixed with : 180 parts of a 70% solids solution of an acrylic copolymer of hydroxybutyl acrylate and butyl acrylate; 240 parts of a crosslinking agent in the form of a 70% solids solution in methylisobutyl ketone obtained by reacting half of the isocyanate groups in an 80/20 mixture of 2,4- and 2,6-toluene diisocyanate with 2-butoxyethanol, and then reacting 3 parts of the product with 1 part of trimethylolpropane; 30 parts of phenoxypropanol as coalescing solvent; and 42 parts of an 80% by weight aqueous solution of lactic acid. 2400 parts of water were added to this mixture slowly and with vigorous agitation using a Silverson emulsifier.

The resulting emulsion was stirred and heated under inert gas to remove water and methyl isobutyl ketone, and any other volatile organic solvent present. The water removed was subsequently replaced, and after filtration the resulting dispersion was diluted to 20% solids. A conventional pigment millbase containing a tin catalyst was then added to produce a coating composition.

A phosphated steel panel as cathode was coated by electrodeposition at 350 volts for 2 minutes using the above coating composition at a bath temperature of 27° C. The composition had a pH of 5.6 and a conductivity of 1650 $\mu$s ccm$^{-1}$. The panel was removed, rinsed with demineralised water and stoved at 180° C. for 20 minutes. A smooth corrosion-resistant coating film was produced which had good mechanical properties when subjected to stone chip, bending and impact tests.

EXAMPLE 2

This Example illustrates the preparation of three epoxide-amine reaction products by the procedure of Example 1 the molecular weight of the polyepoxide resin being different in each case. The polyoxyalkylene diamine-monoepoxide adduct used in each case is the same as that described in Example 1(a).

The three epoxide-amine reaction products were prepared according to the method in Example 1(b) using the following ingredients (in parts by weight) :

| Diepoxide (from Shell Chemicals): | 1 | 2 | 3 |
|---|---|---|---|
| Epikote 1007* | 800 | — | — |
| Epikote 1004** | — | 750 | — |
| Epikote 1001*** | — | — | 700 |
| Methylisobutyl ketone | 624 | 506 | 580 |
| Adduct from Example 1(a) | 116 | 195 | 363 |
| N-methyl ethanolamine | 20 | 38 | 64 |
| Epoxide equivalent * | 1800 | | |
| ** | 930 | | |
| *** | 475 | | |

The three resulting final reaction products 1, 2, and 3 were made up into corresponding aqueous dispersions (1), (2) & (3) by the procedure of Example 1(c) using the following formulations (parts by weight) :

| | (1) | (2) | (3) |
|---|---|---|---|
| Final reaction product 1 | 900 | — | — |
| Final reaction product 2 | — | 900 | — |
| Final reaction product 3 | — | — | 900 |
| Crosslinking agent as in Example 1(c) | 240 | 240 | 240 |
| Acrylic copolymer as in Example 1(c) | 180 | 180 | 180 |
| Phenoxy propanol | 30 | 30 | 30 |
| 80% aqueous lactic acid | 24 | 42 | 70 |
| Water | 2400 | 2400 | 2400 |

The dispersion (1) was fine but some coagulant was formed during the solvent stripping stage. The dispersion (2) was very fine and no coagulant was formed during the stripping stage. The dispersion (3) was coarse and totally coagulated during stripping. Thus the diepoxide resin of epoxide equivalent 475 was unsuitable in this type of preparation.

The filtered dispersion (1) and the unfiltered dispersion (2) were made up into coating compositions as described in Example 1(c). They had the following parameters :

| | (1) | (2) |
|---|---|---|
| Paint solids | 20% | 20% |
| pH | 5.3 | 5.6 |
| Conductivity ($\mu$s cm$^{-1}$) | 1335 | 1700 |

Coating films were deposited during 2 minutes on phosphated steel panels by electrodeposition at 380 volts. Smooth, corrosion-resistant films were obtained after baking at 180° C. for 20 minutes.

EXAMPLE 3

This Example illustrates the preparation of an epoxide-amine reaction product using an alternative polyoxyalkylene diamine, bis(3-aminopropyl) polytetrahydrofuran of number average molecular weight 750.

(a) Reaction of the Polyoxyalkylene Diamine with a Monoepoxide 1500 parts of bis(3-amino propyl) polytetrahydrofuran (of molecular weight 750 and commercially available from BASF) were mixed with 500 parts of Cardura E (see Example 1). The mixture was heated to 120° C. when an exotherm set in raising the temperature to 140° C. When the temperature had fallen to 120° C. heating was applied to maintain the temperature of 120° C. for a further one hour. The resulting adduct then had an epoxy value of zero and an amine value of 2 millimoles/g.

(b) Reaction of the Product from (a) with a Polyepoxide and a Secondary Amine The method of Example 1(b) was followed using the following ingredients (parts by weight)

| Diepoxide ("Epikote" 1004) | 2000 |
|---|---|
| Methyl isobutyl ketone | 1320 |
| Adduct from (a) | 1000 |
| N-methyl ethanolamine | 75 |

The final epoxide-amine reaction product had an amine value of 0.67 millimoles/g and a solids content of 66%.

(c) Preparation of an Aqueous Dispersion, a Pigmented Coating Composition and an Electrodeposited Coating Film The same procedure and formulations were used as in Example 1(c) but the epoxide-amine reaction product obtained in 1(b) was replaced by that obtained in (b) above.

The resulting coating composition at 20% solids had a pH of 5.0 and a conductivity of 1660 μs cm$^{-1}$.

Coating films which were deposited by electrodeposition at 360 volts during 2 minutes and then stoved were smooth and corrosion-resistant.

EXAMPLE 4

This Example illustrates the preparation of an epoxide-amine reaction product using a mixture of polyoxyalkylene diamines, their average molecular weight being higher than that of the diamine used in Example 1.

(a) Reaction of Polyoxyalkylene Diamine with Monoepoxide

The procedure of Example 1(a) was followed using the following ingredients (parts by weight) :

| Polyoxyalkylene- | "Jeffamine" D400* | 500 |
|---|---|---|
| diamine | "Jeffamine" D2000** | 800 |
| Cardura "E" | | 416 |

("Cardura" & "Jeffamine" are Registered Trade Marks)

\* = 400 } molecular weight.
\*\* = 2000

The proportions of the two polyoxyalkylene diamines which are used give an average number average molecular weight of 800.

The resulting adduct had an epoxy value of zero and an amine value of 1.9 millimoles/g.

(b) Reaction of the Product from (a) with a Polyepoxide and a Secondary Amine The procedure of Example 1(b) was followed using the following ingredients (parts by weight) :

| Diepoxide ("Epikote" 1004) | 1800 |
|---|---|
| Methyl isobutyl ketone | 1210 |
| Adduct as prepared in Example 3(a) | 945 |
| N-methyl ethanolamine | 75 |

The final epoxide-amine reaction product had an epoxy value of zero and an amine value of 0.7 millimoles/g.

(c) Preparation of an Aqueous Dispersion, a Pigmented Coating Composition and an Electrodeposited Coating Film The procedure of Example 1(c) was followed using the following ingredients (parts by weight) :

| Epoxide-amine reaction product from (b) above | 900 |
|---|---|
| Crosslinking agent as used in Example 1(c) | 240 |
| Acrylic copolymer as used in Example 1(c) | 180 |
| Phenoxy propanol | 30 |
| 80% aqueous lactic acid | 36 |
| Water | 2400 |

The emulsion was stripped of solvent and made up into a pigmented coating composition which had the following parameters:

| bath solids | 20% |
|---|---|
| pH | 5.6 |
| conductivity | 1500 μs cm$^{-1}$ |

Coating films which were electrodeposited and then stoved were smooth and had good mechanical and corrosion protecting properties.

EXAMPLE 5

This Example illustrates the preparation of two epoxide-amine reaction products in which there is used either an alternative monoepoxide or an alternative secondary amine.

(a) Reaction of Polyoxyalkylene Diamine with Monoepoxide (Phenyl Glycidyl Ether)

The procedure of Example 1(a) was followed using the following ingredients (parts by weight)

| | |
|---|---|
| Phenyl glycidyl ether | 300 |
| "Jeffamine" D400 | 800 |

The resulting adduct had an epoxy value of zero and an amine value of 3.3 millimoles/g.

(B) Reaction of each of the Adducts from Example 1(a) and Example 5(a) Respectively, with a Polyepoxide and with a Secondary Amine, One of which Amines is Different from that Previously Used.

The procedure of Example 1(b) was followed using the following formulations (parts by weight):

| | (1) | (2) |
|---|---|---|
| Diepoxide ("Epikote" 1004) | 1600 | 1600 |
| Methyl isobutyl ketone | 1050 | 1108 |
| Adduct from Example 1(a) | — | 440 |
| Adduct from Example 5(b) above | 360 | — |
| N-methyl ethanolamine | 74 | — |
| Diethanolamine | — | 109 |

The final epoxide-amine reaction products (1) & (2) had an epoxy value of zero and amine values of 0.70 millimoles/g and 0.76 millimoles/g respectively.

(c) Preparation of Aqueous Dispersions, Pigmented Coating Compositions and Electrodeposited Coating Films.

The procedure and formulations of Example 1(c) were followed to give aqueous paints having the parameters:

| | (1) | (2) |
|---|---|---|
| bath solids | 20% | 20% |
| pH | 5.75 | 5.2 |
| conductivity ($\mu$s cm$^{-1}$) | 1840 | 1710 |

Coating films deposited on phosphated steel panels at 300 volts for 2 minutes were smooth and corrosion resistant.

EXAMPLE 6

This Example illustrates the preparation of epoxide amine reaction products using three different molar proportions of the monoepoxide D.

(a) Reaction of Bis(3-Aminopropyl) Polytetrahydrofuran (Molecular Weight 750) with 1,2 & 3 Moles Respectively of the Monoepoxide Three adducts were prepared by the procedure of Example 1(a) using the following proportions (parts by weight): (1) (2) (3)

| | (1) | (2) | (3) |
|---|---|---|---|
| bis(aminopropyl) polytetrahydrofuran | 750 | 750 | 750 |
| Cardura E | 250 | 500 | 750 |

The three products each had an epoxy value of zero and amine values of: 2, 1.55 and 1.3 millimoles/g respectively.

(b) Reaction of the Adducts of 6(a) with a Polyepoxide and a Secondary Amine

The procedure of Example 1(b) was followed using the following ingredients (parts by weight):

| | (1) | (2) | (3) |
|---|---|---|---|
| "Epikote" 1004 | 2000 | 2000 | 2000 |
| Methylisobutyl ketone | 1320 | 1430 | 1530 |
| Adduct (1) | 1000 | — | — |
| Adduct (2) | — | 1250 | — |
| Adduct (3) | — | — | 1500 |
| N-methyl ethanolamine | 75 | 75 | 75 |

The resulting epoxide-amine reaction products had the following epoxy and amine values:

| | (1) | (2) | (3) |
|---|---|---|---|
| epoxide value (mm/g) | 0 | 0 | 0.08 |
| amine value (mm/g) | 0.67 | 0.62 | 0.6 |

(c) Preparation of Aqueous Dispersions, Pigmented Coating Compositions and Electrodeposited Coating Films The procedure and formulations of Example 1(c) was followed using the above resins.
The derived paints had the constants:

| | (1) | (2) | (3) |
|---|---|---|---|
| bath solids content (%) | 20 | 20 | 20 |
| pH | 5.0 | 4.0 | 3.3 |
| conductivity ($\mu$s cm$^{-1}$) | 1655 | 1575 | 1093 |

Coating films deposited from these paints at 360 volts on phosphated steel panels were smooth with good corrosion resistance and mechanical properties.

EXAMPLE 7

This Example illustrates the effect of altering the relative amounts of the secondary amine and of the polyoxyalkylene diamine-monoepoxide adduct in order to increase that amount of the final product which does not contain a polyoxyalkylene diamine residue or a monoepoxide residue.

(a) Reaction of a Polyepoxide with Varying Levels of N-methyl Ethanolamine and Polyoxypropylene Diamine-Cardura E Adduct Two resins were prepared according to the procedure of Example 1(b) using the type "Jeffamine" D400-Cardura E adduct described in Example 1(a) but with the quantities (parts by weight):

| | (1) | (2) |
|---|---|---|
| "Epikote" 1004 | 1000 | 1000 |
| Methylisobutyl ketone | 600 | 665 |
| Adduct from 1(a) | 325 | 245 |
| N-Methyl ethanolamine | 37.5 | 48 |

(b) Preparation of Aqueous Dispersions, Pigmented Coating

Compositions and Electrodeposited Coating Films

Emulsions and paints were made up according to the procedure and formulations of Example 1(c). The resultant baths had the following constants:

|  | (1) | (2) |
| --- | --- | --- |
| bath solids content | 20% | 20% |
| pH | 5.6 | 5.6 |
| Conductivity ($\mu s\ cm^{-1}$) | 1560 | 1700 |

Films deposited at 300 volts on phosphated steel panels gave smooth coating films. However, the paint derived from resin (2) had improved corrosion protection and throwing power compared to (1) with no apparent loss in any other property.

EXAMPLE 8

This Example illustrates the preparation of a resin, similar to that prepared in Example 1, but by a single-stage process rather than by the two-stage process used in the previous Example.

(a) Preparation of a Resin from a Polyepoxide, a Monoepoxide, a Polyoxyalkylene Diamine and a Secondary Amine 800 parts of "Epikote" 1004 were dissolved in 532 parts of methylisobutyl ketone and 75 parts of "Cardura" E with rapid stirring and at a temperature of 90° C.

120 parts of "Jeffamine" D400 and 37 parts of N-methyl ethanolamine were added to the solution and the mixture brought to reflux.

After 2½ hours the epoxy value had fallen to zero. The amino value was 0.70 millimoles/g at 68% solidscontent and the Gardner-Holdt viscosity was $Z_6$–$Z_7$ at 25° C.

This should be compared with the resin obtained from Example 1(b) which had an amine value of 0.74 millimoles/g at 68% but had a Gardner-Holdt viscosity of $Z_4$–$Z_5$ at 25° C.

(b) Preparation of Aqueous Dispersions, Pigmented Coating

Compositions and Electrodeposited Coating Films

The emulsion and paint was made up according to the procedure of Example 1(c) and coating films deposited onto phosphated steel panels at 360 volts for 2 minutes. The cured films obtained from this paint were compared to those obtained from the paint of Example 1(c).

No significant differences were found between the two paints although the films containing the resin prepared in Example 1 tended to be smoother than those containing the resin prepared in Example 8(a).

The bath constants of the two paints are compared below:

|  | Example 1(c) | Example 8 |
| --- | --- | --- |
| bath solids content (%) | 20% | 20% |
| pH | 5.6 | 5.5 |
| Conductivity ($\mu s\ cm^{-1}$) | 1650 | 1690 |

EXAMPLE 9

This Example illustrates the use of an alternative cross-linking agent.

(a) Preparation of an Aqueous Dispersion, a Pigmented

Coating Composition and the Electrodeposition of

Coating Films

The procedure and formulation of Example 1(c) was followed except that the blocked diisocyanate was replaced with 240 parts of a commercially available phenol-formaldehyde resin—"Uravar" L9 ("Uravar is a Registered Trade Mark) and 24 parts of a crosslinking-promoting catalyst—"Vesturit" BL 1203 (commercially available from Hüls).

The resulting paint had the bath constants:

| solids content (%) | 20 |
| --- | --- |
| pH | 5.6 |
| Conductivity ($\mu s\ cm^{-1}$) | 1660 |

Films deposited onto phosphated steel panels were smooth and well cured after stoving at 180° C. for 30 minutes.

EXAMPLE 10

This Example illustrates the preparation of pigmented coating compositions similar to that described in Example 1 but in which the acrylic copolymer was either omitted or replaced by a different copolymer.

The Preparation of Aqueous Dispersions and

Pigmented Coating Compositions and the Electrodeposition of Coating Films

The procedure and formulation of Example 1(c) was followed in two further preparations except that the acrylic polymer there described;
(1) was not present
(2) was replaced by a non-hydroxyl-containing polymer made from butyl acrylate and butyl methacrylate.

The resulting paint had the bath constants:

|  | (1) | (2) |
| --- | --- | --- |
| solids content (%) | 20 | 20 |
| pH | 5.6 | 5.6 |
| Conductivity ($\mu s\ cm^{-1}$) | 1550 | 1500 |

Coating films deposited onto phosphated steel panels at 350 volts were smooth and well cured after stoving and showed good corrosion resistance.

EXAMPLE 11

This Example illustrates the preparation of an aqueous dispersion similar to that of Example 1 but in which the acrylic polymer was prepared in situ i.e. by polymerising the acrylic monomers in the presence of the other components which are to be present in the dispersion.

(a) The formulation of Example 1(c) was used except that the acrylic polymer was omitted and instead a mixture of 92 parts of hydroxybutyl acrylate monomer, 31 parts of butyl acrylate monomer, 6 parts of t-butyl perbenzoate and 1 part of octyl mercaptan were substituted.

After emulsification the acrylic monomers were polymerised by adding a solution of 1 part of ascorbic acid, 0.25 part of ferrous sulphate in 70 parts of water to the emulsion. The mixture was stirred gently overnight after which time the polymerisation was complete.

The resulting emulsion was stripped of volatile organic solvents and made into a coating composition.

The bath constants (compared with those from Example 1) were:

|  | Example 1 | Example 11 |
|---|---|---|
| bath solids | 20% | 20% |
| pH | 5.6 | 5.4 |
| Conductivity ($\mu s\ cm^{-1}$) | 1650 | 1640 |

Coating films were deposited on phosphated steel panels at 400 volts which, after stoving, gave smooth corrosion resistant films. No significant difference in properties were observed between the coating films deposited on panels from the compositions described in Example 1 or Example 11.

EXAMPLE 12

This Example illustrates the use of the resins of this invention as aqueous pigment dispersants.

(a) Preparation of a Pigment Dispersant Based on a Polyepoxide, a Polyoxyalkylene Diamine, a Monoepoxide and a Secondary Amine 1356 parts of "Epikote" 1001 were dissolved in 2334 parts of dipropylene glycol methyl ether by stirring at 100° C.

876 parts of an adduct of "Jeffamine" D400 and "Cardura" E as described in Example 1(a) and 102 parts of N-methyl ethanolamine were added and the mixture maintained at 110° C. for 2 hours then 120° C. for 1 hour.

After this time the epoxy value had fallen to zero.

The amine value was 1.78 millimoles/g (100% solids).

The solution was cooled and 325 parts of 80% lactic acid solution were added.

The resulting solution was shown to be an effective pigment dispersant as follows:

(b) Preparation of Pigment Dispersion Based on the Epoxide Amine Adduct Described in Example 12(a)

A ball mill of 1-litre nominal volume was charged with a pigment slurry comprising:

|  | parts |
|---|---|
| Epoxide-amine adduct solution as described in Example 12(a) | 41 |
| Demineralised water | 151 |
| Carbon black | 2 |
| Basic lead silicate | 5 |
| China clay | 82 |
| Titanium dioxide | 86 |

-continued

|  | parts |
|---|---|
| Dibutyl tin oxide catalyst | 6 |

The pH of the slurry was adjusted to 5.5 by adding lactic acid. The standard weight of steatite balls was added and the mill run for 16 hours. At the end of this time the pigment was well dispersed and had a fineness value of Hegman No. 7.

A further 41 grams of epoxide-amine adduct solution as described in Example 12(a), 20 grams of dipropylene glycol methyl ether, 20 grams of water and 2 grams of white spirit as anti-foaming agent were added to the ballmill. After grinding for a further 30 minutes the millbase was run off through a strainer and produced a yield of 322 grams. It had a fineness of Hegman No. 7.

(c) Preparation of Paint from Pigment Dispersion and its Application to a Substrate by Electrodeposition 400 grams of mill-base made as described in Example 12(b) were blended with 1410 grams of the aqueous resin dispersion described in Example 1(c) and 802 grams of water to produce a grey paint with a solids content of about 20%. The pH was 5.5 and the conductivity 1890 microSiemens per centimetre.

A phosphated steel panel as cathode was coated by electrodeposition at 320 volts for 2½ minutes using the above paint at a bath temperature of 28° C. The panel was removed, rinsed with demineralised water and stoved at 180° C. for 20 minutes. The coating was smooth and of moderate gloss.

EXAMPLE 13

This Example illustrates the preparation of an amine-epoxide reaction product from co-reactants A, B, C and D and its use in a coating composition. A polyepoxide is prepared from intermediates and is reduced in 1,2-epoxy functionality by reaction in situ with phenol before it is reacted with a polyoxyalkylene triamine.

(a) Preparation of Polyepoxide

The polyepoxide of reduced functionality was prepared in situ by co-reacting 1520 parts of "Araldite" GY 2600 (a diepoxide of epoxide equivalent 190 "Araldite" is a registered trade mark), 456 parts of Bisphenol A and 220 parts of nonyl phenol under inert gas in a flask fitted with a stirrer and a condenser. The mixture was heated to 150~C. and 2 parts of triphenyl ethyl phosphonium iodide were added. After the initial exotherm the temperature was maintained at 150~C for a further 1 hour. Methyl isobutyl ketone was added to the product in sufficient amount to yield a final product of 81% non-volatile content. The epoxide content of the resin was 1.09 mm/g.

(b) Preparation of Amine-Epoxide Reaction Product 1377 parts of the above polyepoxide resin final product were co-reacted with 220 parts of a polyoxyalkylene triamine of approximate number average molecular weight 440 (commercially available as "Jeffamine" T-403 from the Jefferson Chemical Company; "Jeffamine" is a registered trade mark), 37.5 parts of N-methyl ethanolamine and 62.5 parts of "Cardura" E (a commercially available glycidyl ester of a $C_8$ tertiary alkyl monocarboxylic acid; "zCardura" is a registered trade mark), by mixing at 90~C and raising the temperature to reflux temperature. Refluxing was continued for 1 hour, the product cooled and further methyl isobutyl ketone added to provide a final product of non-volatile content 74%. The final epoxy value was zero and the diamine content 1.03 mm/g.

(c) Preparation of Aqueous Emulsion of Acid Salt of Aamine-Epoxide Reaction Product and Application of Derived Coating Composition by Electrodeposition A fine aqueous emulsion was prepared, using a Silverson emulsifier, from the following ingredients:

|  | Parts |
| --- | --- |
| Amine-epoxide reaction product (prepared in (b) above) | 700 |
| Crosslinking agent (as used in Example 1(c)) | 340 |
| Phenoxy propanol | 20 |
| Lactic acid | 32 |
| Water | 1200 |

The resulting emulsion was stripped free of solvent (by distillation) and the solids content adjusted to 20% by weight by adding further water. 2000 parts of the emulsion were blended with 400 parts of the millbase as prepared in Example 12 (b) and the mixture allowed to stir overnight. The resulting paint had a pH of 6 and a conductivity of 1785 $\mu s\ cm^{-1}$.

Steel panels pretreated with zinc phosphate were immersed in the paint thus prepared and a direct electric current passed for 120 seconds at 300 volts. A smooth corrosion-resistant coating film was obtained after baking the panels at 180~C.

EXAMPLE 14

This Example illustrates the preparation of an amine-epoxide reaction product from co-reactants A, B and C, in which inter alia a polyepoxide of reduced 1,2-epoxide functionality is reacted with a polyoxyalkylene triamine; and the use of the reaction product in a coating composition.

(a) Preparation of Polyepoxide and Amine-Epoxide Reaction Product 1000 parts of a commercially available diepoxide (commercially available as "Epikote" 10-1; "Epikote" is a registered trade mark of Shell Chemicals) and 110 parts of nonyl phenol were dissolved in 500 parts of methyl isobutyl ketone and the temperature raised to 90~C to aid dissolution. The initial epoxide value was 25 mm/g. 1 part of dimethylbenzylamine was added and the mixture raised to reflux temperature. After about 50 minutes the epoxide value had fallen to 0.95 mm/g.

The mixture was cooked to 90~C and a blend of 200 parts of a polyoxyalkylene triamine of approximate molecular weight 440 (commercially available as "Jeffamine" T-403) and 37 parts of N-methylethanolamine were added. The mixture was brought back to the reflux temperature and refluxing continued for 2 hours to ensure complete reaction. A further 77 parts of methyl isobutyl ketone were added. The final product had a solids content of 70% by weight, an amine value of 0.97 mm/g and an epoxide value of zero.

(b) Preparation and Electrodeposition of Coating Composition 450 parts of the amine-epoxide reaction product prepared in (a) above were blended with 200 parts of a 70% solution in methyl isobutyl ketone of a crude diphenyl methane diisocyanate (commercially available as "Suprasec" DND; "Suprasec" is a registered trade mark of Imperial Chemical Industries PLC) which had been totally reacted with butyl carbitol, 90 parts of a 70% solution in methyl isobutyl ketone of a 75/25 hydroxybutyl acrylate/butyl acrylate copolymer, 15 parts of phenoxy propanol and 20 parts of an 80% aqueous solution of lactic acid. 1200 parts of water were added slowly to this mixture using a Silverson emulsifier to form a fine aqueous emulsion. The emulsion was stripped free of solvent by distillation and the solids content adjusted to 20% by weight by adding further water.

A pigment millbase was prepared in a ball mill from the following ingredients:

|  | Parts |
| --- | --- |
| Amine-epoxide reaction product pigment dispersant as described in Example 12(a) | 37 |
| Water | 147 |
| Carbon black | 2 |
| Basic lead silicate | 5 |
| China clay | 80 |
| Titanium dioxide | 88 |
| Dibutyl tin oxide catalyst | 6 |

The pH of the mixture of ingredients was adjusted to 6.0 with lactic acid and the ball mill run for 16 hours with the standard weight of steatite balls. At the end of this time the pigment was well dispersed and had a fineness value of Hegman No. 7.

2000 parts of the fine aqueous emulsion and 400 parts of the pigment mill base, both as described above, were blended and stirred overnight. The resulting paint had a pH of 6.7 and a conductivity of 2100 $\mu s\ cm^{-1}$ steel panels pretreated with zinc phosphate were immersed in the paint and an electric current passed for 120 seconds at 300 volts. Smooth, corrosion-resistant coating films on the panels were obtained after baking for 20 minutes at 150~C.

EXAMPLE 15

This Example illustrates the preparation of an amine-epoxide reaction product from co-reactants A, B, C and D in which the polyoxyalkylene polyamine is a triamine which has been pre-reacted with either 1 or 2 moles of a mono-epoxide.

Two samples of 440 parts of a polyoxyalkylene triamine of molecular weight approximately 440 (commercially available as "Jeffamine" T-403) were pre-reacted With (a) 250 parts and (b) 500 parts, respectively, of glycidyl ether of a $C_8$ tertiary alkyl monocarboxylic acid, commercially available as "Cardura" E. In the case of (a) the mixture was heated to 120~C and after an exotherm the temperature was maintained at 140~C for 2 hours. The product had an amine value of 4.3 mm/g and an epoxide value of zero. In the case of (b) the mixture was heated at 140~C for 1 hour. Heating was maintained at 140~C for a further 1 hour. The product had an amine value of 3.2 mm/g and an epoxide value of zero.

Use of product (a)—1900 parts of a diepoxide (commercially available as "Epikote" 1004) were dissolved in 1125 parts of methyl isobutyl ketone at 90°C. This solution had an epoxide value of 0–7 mm/g. 75 parts of N-methyl ethanolamine and 690 parts of product (a) were added to the solution and the mixture then heated and maintained at reflux temperature for 2 hours. The product had an amine value of 0.8 mm/g, an epoxy value of zero and a solids content of 70% by weight. When an aqueous dispersion and coating composition were prepared using the procedure of Example 1(c) the coating composition had a pH of 6.0 and a conductivity of 2300 s cm$^{-1}$.

Use of product (b)—1900 parts of a diepoxide (commercially available as "Epikote" 1004) were dissolved in 1250 parts of methyl isobutyl ketone at 90° C. This solution had an epoxide value of 0.7 mm/g. 75 parts of N-methylethanolamine and 940 parts of the product (b) were added to the solution and the mixture then heated and maintained at reflux temperature for 2 hours. The product had an amine value of 0.96 mm/g, an epoxy value of zero and a solids content of 70% by weight. When an aqueous dispersion and coating composition were prepared by the procedure of Example 1(c) the coating composition had a pH of 5.3 and a conductivity of 2120 μs cm$^{-1}$.

We claim:

1. An aqueous dispersion of an ionizable salt of a non-gelled amine-epoxide reaction product which is obtained by co-reacting:
   (A) a secondary amine NHR$_1$R$_2$, wherein R$_1$ and R$_2$ are the same or different and are C$_{1-18}$ alkyl, cycloalkyl, substituted alkyl or substituted cycloalkyl, or R$_1$ and R$_2$ represents together with the N atom a cyclic structure, said cyclic structure being substituted or unsubstituted;
   (B) a polyepoxide;
   (c) a polyoxyalkylene polyamine;
   (d) a monoepoxide; and
   (E) a monoprimary amine.

2. A product according to claim 1 where the polyoxyalkylene polyamine (C) is first reacted with the monoepoxide (D) before reaction with the polyepoxide (B) and secondary amine (A).

3. A product according to claim 1 where the secondary amine (A) is an hydroxyalkylamine.

4. A product according to claim 3 where the secondary amine (A) is N-methylethanolamine.

5. A product according to claim 1 where the 1, 2 epoxide functionality of the polyepoxide (B) is 1.4 to 1.8.

6. A product according to claim 1 where the polyepoxide (B) is a polyglycidyl ether of a cyclic polyol having an epoxide equivalent in the range 200–2000.

7. A product according to claim 6 where the polyepxide (B) is made up from epichlorohydrin and bis(4-hydroxyphenyl) -2,2-propane.

8. A product according to claim 1 where the polyepoxide (B) is a glycidyl ether -bis(4-hydroxy-phenyl) -2,2- propane polyepoxide of epoxide equivalent from 475 to 1800.

9. A product according to claim 1 where the polyoxyalkylene polyamine (C) has an number average molecular weight in the range 150 to 4000.

10. a product according to claim 1 where the polyoxyalkylene polyamine (C) is a diamine of structure:

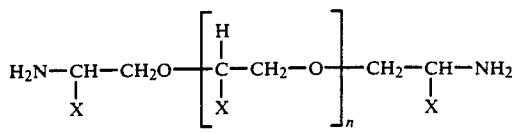

where X is hydrogen or C$_{1-6}$ alkyl and n is an integer in the range 1–50; or a triamine of structure:

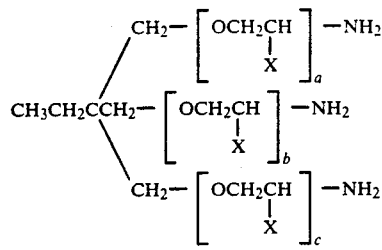

where X is hydrogen or C$_{1-6}$ alkyl and a+b=c=3–30.

11. A product according to claim 1 where the monoepoxide is the glycidyl ester of a C$_8$ tertiary alkyl carboxylic acid.

12. A product according to claim 1 where the monoprimary amine (E) is ethanolamine, butylamine, coconut oil amine, dimethylaminopropylamine, diethylaminopropylamine, N-aminopropyldiethanolamine or N-aminopropylmorpholine.

13. A product according to claim 1 where the secondary amine (A) is N-methylethanolamine, the polyepoxide (B) is a glycidyl ether-bis (4-hydroxyphenyl)-2,2-propane polyepoxide of epoxide equivalent 930, the polyoxyalkylene polyamine (C) is a linear polyoxypropylene diamine of a number average molecular weight 400 and the monoepoxide (D) is a glycidyl ester of a C$_8$-tertiary alkyl carboxylic acid.

14. A product according to claim 1 where the secondary amine (A) is N-methylethanolamine, the polyepoxide (B) is a glycidyl ether-bis(4-hydroxyphenyl)-2,2-propane polyepoxide of epoxide equivalent 930, the polyoxyalkylene polyamine (C) is bis(3-aminopropyl) polytetrahydrofuran of number average molecular weight 750, and the monoepoxide (D) is a glycidyl ester of a C$_8$-tertiary alkyl carboxylic acid.

15. A product according to claim 1 where the secondary amine (A) is N-methylethanolamine, the polyepoxide (B) is a glycidyl ether-bis(4-hydroxyphenyl)-2,2-propane polyepoxide of epoxide equvalent 930, the polyoxyalkylene polyamine (C) is a mixture of polyoxylkylene diamines of number molecular weights 400 and 2000 in such a proportion as to give an average number average molecular weight of 800 and the monoepoxide (D) is a glycidyl ester of a O-tertiary alkyl carboxylic acid.

16. A product according to claim 1 where the secondary amine (A) is N-methylethanolamine or diethanolamine, the polyepoxide (B) is a glycidyl ether-bis(4-hydroxyphenyl) -2,2-propane polyepoxide of epoxide equivalent 930, the polyoxyalkylene polyamine (C) is a polyoxypropylene diamine of number average molecular weight 400 and the monoepoxide (D) is phenylglycidyl ether.

17. A product according to claim 1 where the secondary amine (A) is N-methylethanolamine, the polyepoxide (B) is a glycidyl ether-bis(4-hydroxyphenyl)-2,2-propane polyepoxide of epoxide equivalent weight 930, the polyoxyalkylene polyamine (C) is a triamine of number average molecular weight 440 and the monoepoxide (D) is a glycidyl ester of a C$_8$-tertiary alkyl carboxylic acid.

18. A coating composition comprising an aqueous dispersion of an ionizable acid salt of a non gelled reaction product according to claim 1.

* * * * *